United States Patent
Footer et al.

(10) Patent No.: US 11,627,706 B2
(45) Date of Patent: Apr. 18, 2023

(54) SLIDING TRAYS DROP SEEDER APPARATUS

(71) Applicant: Paperpot Co., Vista, CA (US)

(72) Inventors: Adam Footer, VIsta, CA (US); Curtis Stone, Vista, CA (US); Warren Fradette, Kelowna (CA)

(73) Assignee: Paperpot Co., Vista, CA (US)

( * ) Notice: Subject to any disclaimer, the term of this patent is extended or adjusted under 35 U.S.C. 154(b) by 557 days.

(21) Appl. No.: 16/781,670

(22) Filed: Feb. 4, 2020

(65) Prior Publication Data

US 2021/0235630 A1    Aug. 5, 2021

(51) Int. Cl.
*A01G 9/08*     (2006.01)
*A01G 9/029*    (2018.01)

(52) U.S. Cl.
CPC .......... *A01G 9/085* (2013.01); *A01G 9/0299* (2018.02)

(58) Field of Classification Search
CPC .............................. A01G 9/085; A01G 9/0299
See application file for complete search history.

(56) References Cited

U.S. PATENT DOCUMENTS 3,073,486 A * 1/1963 Ratcliffe ................. A01C 7/04
                                                        222/509
6,142,083 A * 11/2000 Cox, Jr. ................... A01C 7/04
                                                        111/105

FOREIGN PATENT DOCUMENTS

CH              669306 A5 *   3/1989

* cited by examiner

*Primary Examiner* — Jessica B Wong
(74) *Attorney, Agent, or Firm* — Lee & Hayes, P.C.

(57) ABSTRACT

A drop seeder apparatus includes a frame and a bottom plate having a plurality of through holes. A top plate has a plurality of through holes. The top plate is secured in the frame and positioned in a sliding relationship with respect to the bottom plate. A system of legs is configured to adjust a length thereof to accommodate seed trays of varying heights. A slide actuation system is configured to allow a user to slide the top plate across the bottom plate and cause the top plate to automatically return to a default trap position.

18 Claims, 7 Drawing Sheets

SLIDING TRAYS DROP SEEDER APPARATUS

BACKGROUND

Drop seeders have been in use for many years to assist farmers and others in agriculture. A conventional drop seeder includes a tray with an upper plate and a lower plate that have a matching pattern of holes therethrough. Seeds are dropped onto the upper plate so that one or more seeds fall into a hole on the upper plate, which hole is blocked by the lower plate since the holes in the plates are offset initially. Then the upper plate is shifted such that the holes of the upper plate are aligned with the holes of the lower plate, whereby the seeds that were previously trapped in the holes of the upper plate, are able to slide through the open holes in the lower plate to fall and be deposited into preformed pots or cups having soil and/or other fertilization material therein that is adequate to support the seeds for future growth. However, little has been done to try to improve the conventional drop seeder to make it more versatile, faster, accurate, and effective.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

DETAILED DESCRIPTION

Overview

This disclosure is directed to a drop seeder device for efficiently and more simply depositing plant seeds into trays having multiple pots for growing seedlings. More specifically, the drop seeder device described herein includes many improvements over conventional drop seeders, including multiple adjustability features of various aspects of the device to facilitate seed depositing.

Illustrative Embodiments of a Drop Seeder Device

Figure 1:
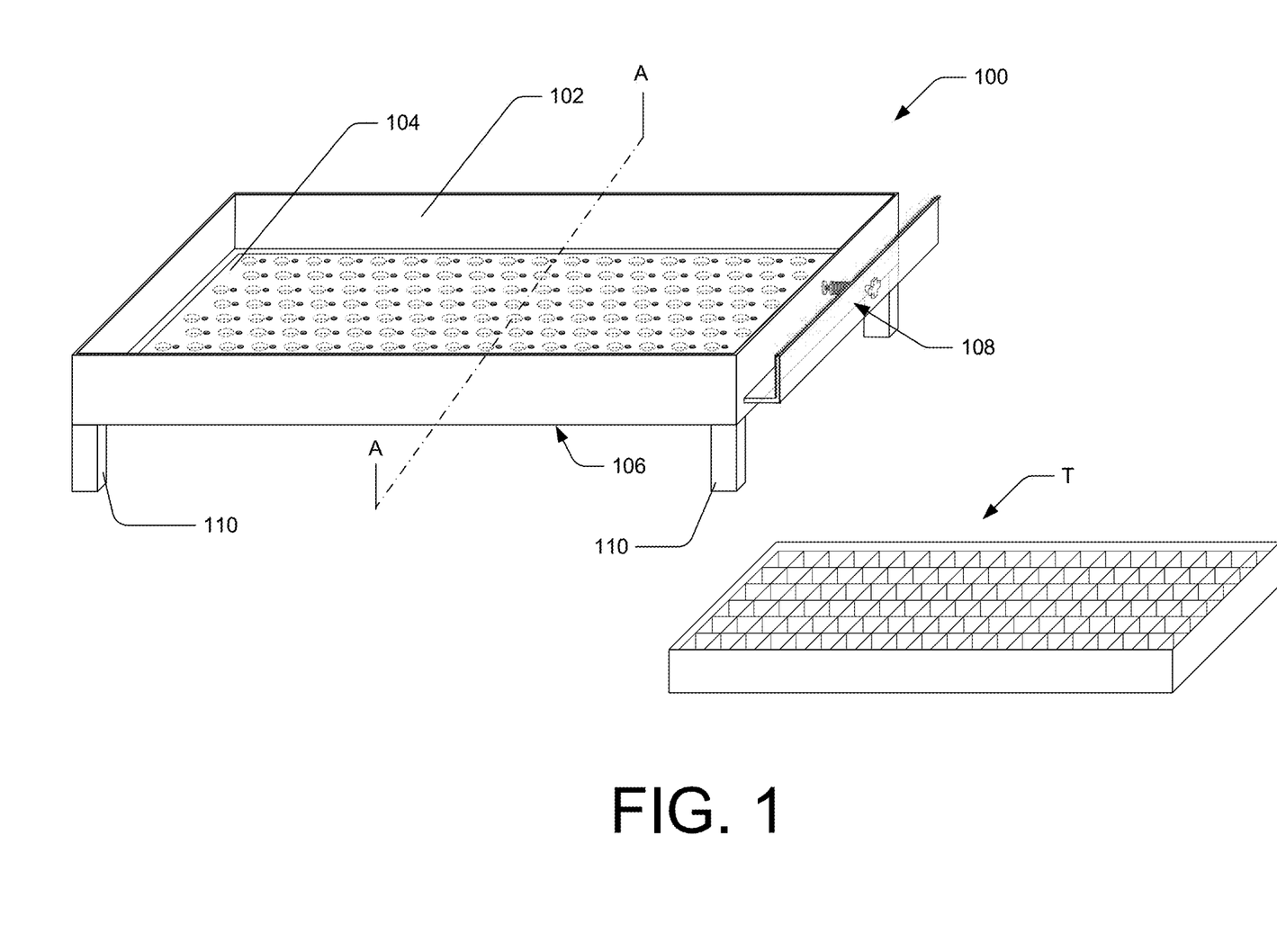
FIG. 1 illustrates a perspective view of a drop seeder device according to an embodiment of this disclosure.

Specifically, FIG. 1 depicts a drop seeder device 100 according to an embodiment. In use, seeds are placed into drop seeder device 100 when positioned above a tray T having multiple pots into which seeds are directed via passing through drop seeder device 100. Various components of drop seeder device 100 are adjustable, thereby improving the utility of the device.

In an embodiment, drop seeder device 100 may include a frame 102 that holds a top plate 104 and a bottom plate 106 (reference arrow pointing to the underside of device 100) that act together to limit the number of seeds to be dropped into a pot within a tray T. Note, for convenience, top plate 104 and bottom plate 106 may occasionally be referred to hereinafter as "plates 104, 106." Frame 102 is depicted as rectangular in shape in FIG. 1. However, other shapes are contemplated, and frame 102 need not be limited to a periphery having a rectangular shape. Frame 102 may be formed of one or more materials including metals, plastics, wood, composites, etc. For example, in an embodiment, frame 102 may be a structure formed from an extruded metal. Additional details of frame 102 are described herein below.

Top plate 104 and bottom plate 106 may be similarly sized in width, which facilitates maintaining plates 104, 106 aligned in frame 102. However, a length of top plate 104 may be longer than a length of bottom plate 106 to extend outside of frame 102 and provide a surface thereof for sliding actuation. Plates 104, 106 are sized to be positioned within frame 102 in planar abutment whereby, upon actuation, a lower facing surface of top plate 104 is able to slide across an upper facing surface of bottom plate 106. As such, plates 104, 106 may generally be formed of sheets of acrylic, for example, or other suitable material that permits sliding against adjacent surfaces. In an embodiment, top plate 104 may slide in a length direction L thereof between a default trap position, in which a seed may be held or "trapped" against the upper facing surface of bottom plate 106, and an actuated release position, in which the seed is able to pass through bottom plate 106. Additionally, and/or alternatively, it is contemplated that similar results may be attained via sliding of bottom plate 106 against top plate 104, or both top plate 104 and bottom plate 106 sliding simultaneously (not shown) to be in alignment in the actuated release position. That is, top plate 104 and bottom plate 106 are secured by frame 102 to restrict movement of top plate 104 and/or bottom plate 106 in at least one of a width direction W and the length direction L. For example, in an embodiment as shown in FIG. 1, bottom plate 106 may be secured in a static position, while allowing top plate 104 to slide in the length direction L during an actuation thereof.

In an embodiment, the movement of one or both of top plate 104 and bottom plate 106, frame 102 may be achieved via a slide actuation system 108 (discussed further herein below) to cause top plate 104 to automatically reset to the default trap position after manual actuation thereof causes top plate 104 to slide momentarily into the actuated release position in which one or more seeds are released.

Further, to adjust the height of the underside of drop seeder device 100 with respect to either a surface on which drop seeder device 100 is located or a surface of a tray beneath drop seeder device 100, frame 102 may include a system of quickly adjustable legs 110 (discussed further herein below). Moreover, frame 102 may include a space adjustment system (discussed further herein) to increase or decrease the gap space in which plates 104, 106 are held, which gap space may vary depending on a combined thickness of the plates 104, 106.

Figure 2:
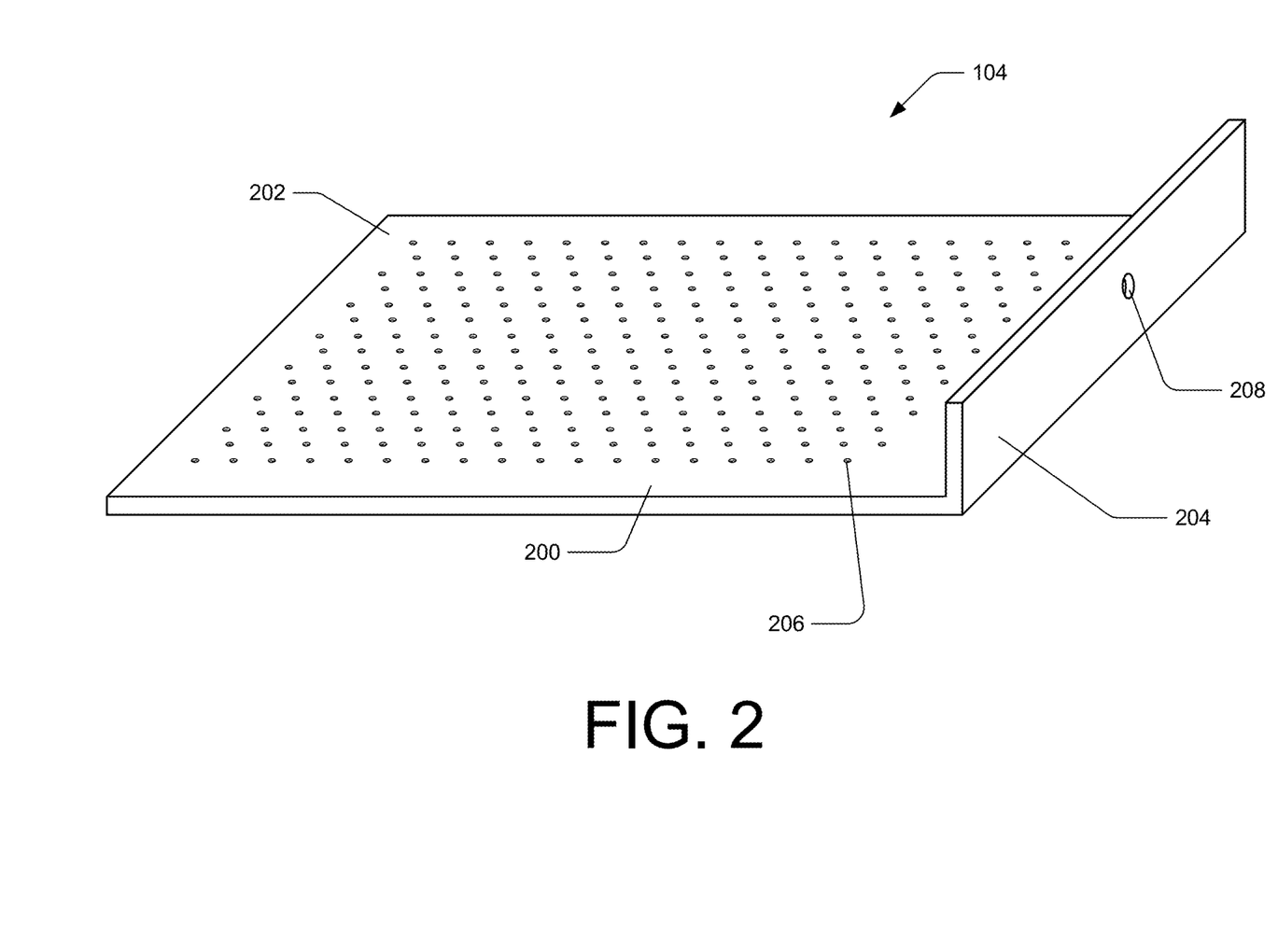
FIG. 2 illustrates a perspective view of a top plate according to an embodiment of this disclosure.

FIG. 2 depicts top plate 104 according to an embodiment in a state removed from drop seeder device 100. Top plate 104 includes a body 200 having a first end 202 that extends planarly for insertion into drop seeder device 100 and a second end 204. In an embodiment, second end 204 of top plate 104 may extend, entirely (as shown) or partially (not shown) across the width direction W thereof, in a direction transverse to a direction of extension of first end 202, thereby presenting a surface that facilitates manual actuation of the sliding motion of top plate 104 to allow seeds to pass through bottom plate 106. For example, a majority of body 200 of top plate 104 may extend planarly with first end 202. However, the material of body 200 may extend continuously to second end 204 of top plate 104 which may be bent out of the plane of first end 202, as shown, thereby extending substantially perpendicularly to the plane in which first end 202 extends.

Top plate 104 further includes a plurality of through holes 206 (lead line only points to one hole for convenience) in a predetermined pattern and of a predetermined number. The predetermined pattern across the plane of body 200 and the number of through holes 206 correspond with the location and quantity of pots within a tray to be seeded, and likewise with the pattern and number of holes in bottom plate 106. Moreover, for any given top plate, the through holes may be sized different than the through holes in a different top plate. That is, the size of a through hole may vary in diameter and depth, which depends on a thickness of the top plate selected. Accordingly, inasmuch as top plate 104 is removable, a variety of top plates may be created and swapped as desired according to the user's need and accompanying equipment, such as the number of pots in the trays, size of seeds, etc.

In an embodiment, second end 204 of top plate 104 may have a hole 208 therethrough. Hole 208 may be sized to allow a portion of slide actuation system 108 to pass therethrough as described below.

Figure 3:
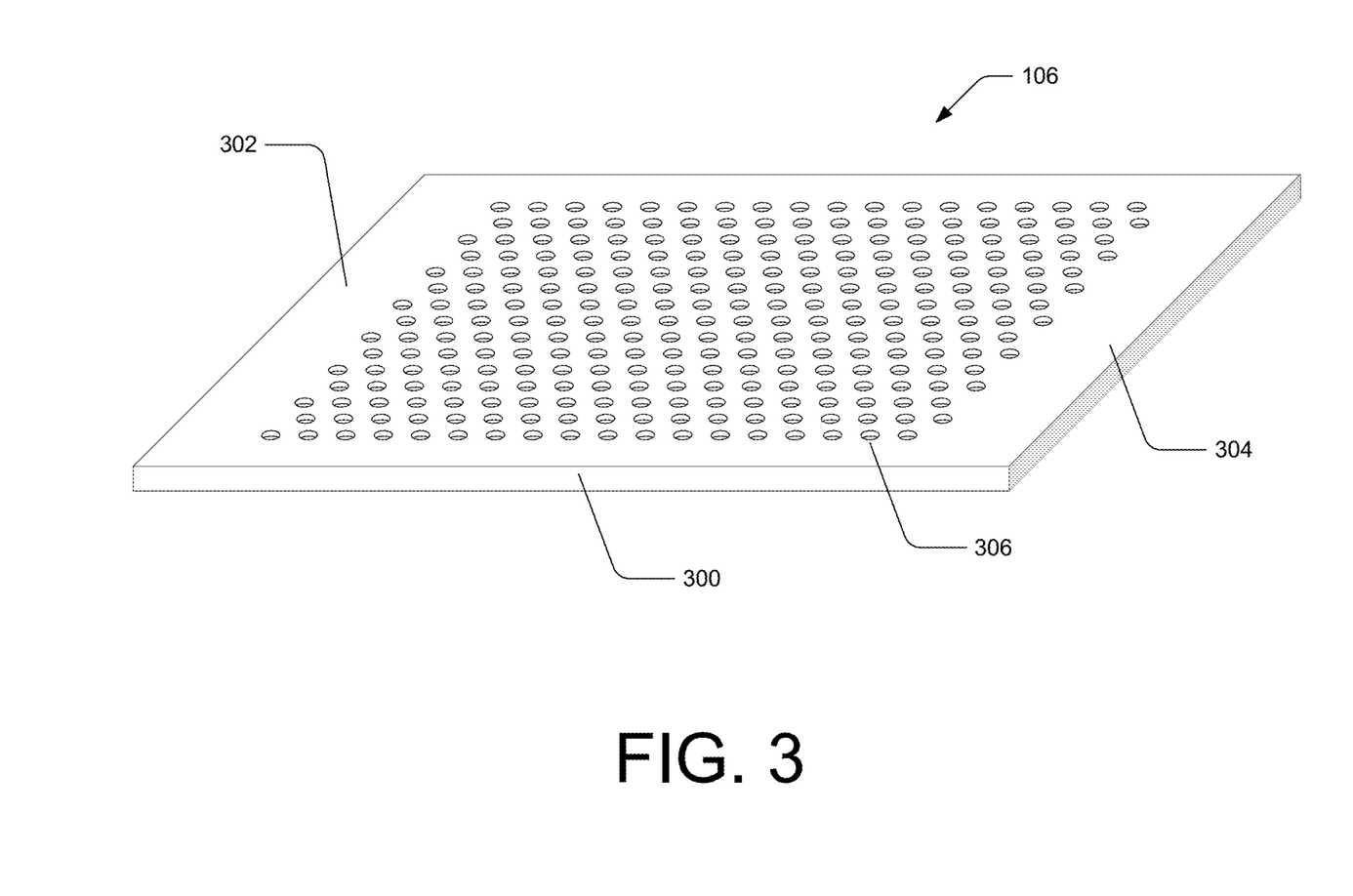
FIG. 3 illustrates a perspective view of a bottom plate according to an embodiment of this disclosure.

FIG. 3 depicts bottom plate 106 according to an embodiment in a state removed from drop seeder device 100. Bottom plate 106 includes body 300 having a first end 302 that extends planarly and continuously to a second end 304 for insertion into drop seeder device 100. Bottom plate 106 further includes a plurality of through holes 306 (lead line only points to one hole for convenience) in a predetermined pattern and of a predetermined number. The predetermined pattern across the plane of body 300 and the number of through holes 306 correspond with the location and quantity of pots within a tray to be seeded, and likewise with the pattern and number of holes in top plate 104. Notably, while the through holes in one bottom plate may be sized different than the through holes in a different bottom plate, variability of the size of through holes 306 in bottom plate 106 may not be necessary in general since the associated purpose is merely to allow the passage of the seeds trapped in the through holes 206 in top plate 104. Regardless of the size, the pattern and number of the through holes 304 corresponds with the pattern and number of through holes 204 of top plate 104 at the time of use. Accordingly, inasmuch as bottom plate 106 is removable, a variety of bottom plates may be created and swapped as desired according to the user's need and accompanying equipment, such as the number of pots in the trays, size of seeds, etc.

Figure 4:
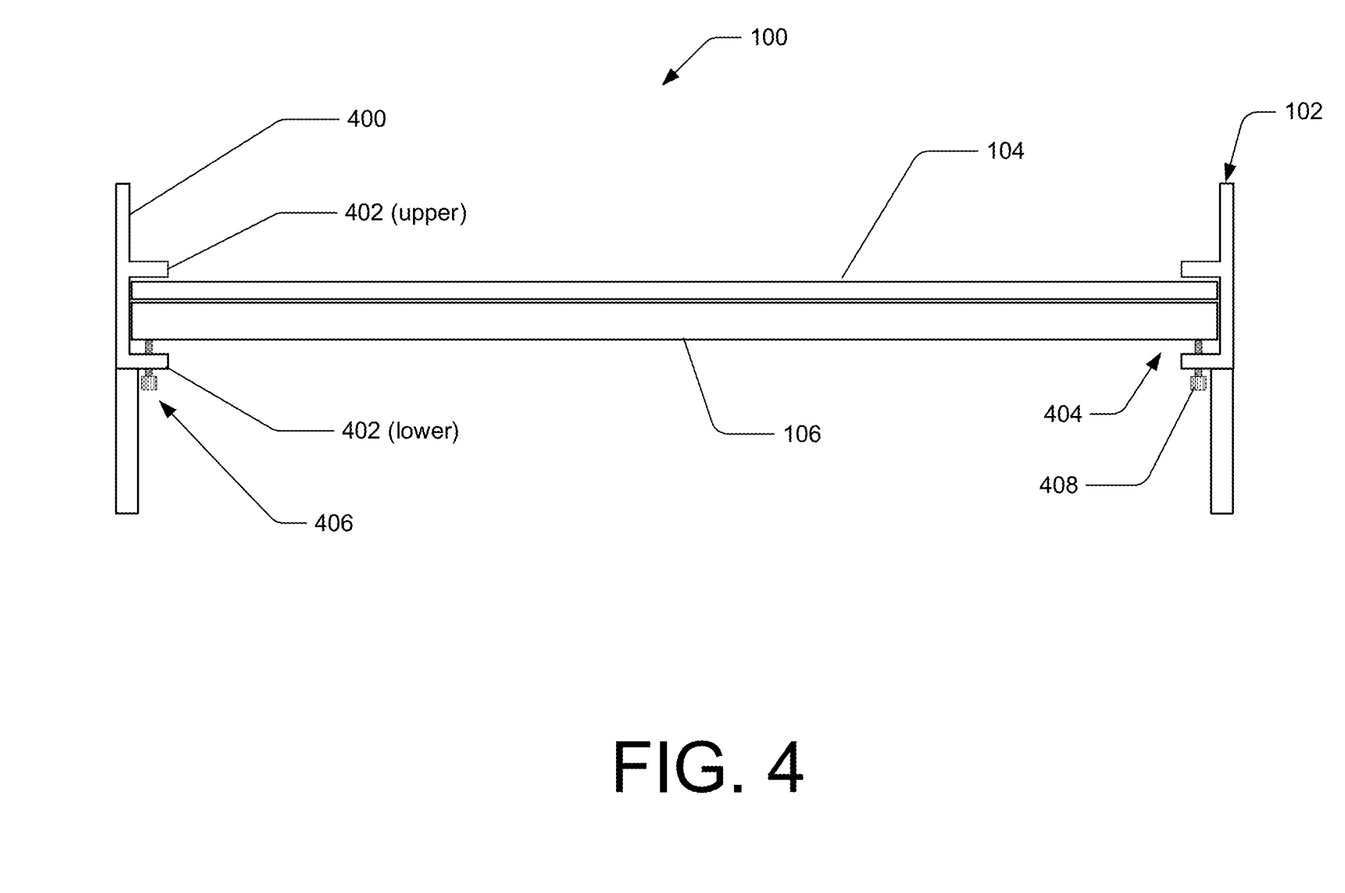
FIG. 4 illustrates a cross-section of a side view of a drop seeder according to an embodiment of this disclosure.

In FIG. 4, a cross-section of drop seeder device 100 taken at line A-A is illustrated. In an embodiment, frame 100 may include a peripheral wall 400 from which a pair of flanges 402 (e.g., an upper flange and a lower flange) extend inwardly from a lower inside edge of peripheral wall 400 such that seeds may be initially contained between the upper portions of opposing peripheral walls against the upper surface of top plate 104. Inasmuch as flanges 402 are substantially parallel, a gap 404 exists therebetween into which lateral edges of plates 104, 106 are held. Due to the variability in seed sizes and shapes, a user may desire to switch out one or more of plates 104, 106, which may have a different thickness than the plates that were previously inserted. In the event that the thickness of the plate used is greater or lesser than the previous plate used, the user may adjust the available space within gap 404 into which plates 104, 106 are held. The available space may be adjusted using space adjustment system 406.

In an embodiment, space adjustment system 406 may include one or more pins 408 (e.g., a thumb screw, a threaded rod having a rotatable end, etc. and lead line only points to one pin for convenience) that are movable in a vertical direction to increase the available space (i.e., shift the one or more pins 408 downward) or decrease the available space (i.e., shift the one or more pins 406 upward). In an embodiment, one or more pins 408 may be disposed through the lower flange of flanges 402. One or more pins 408 may be threaded and may be rotated in threaded holes in the lower flange of flanges 402 adjust the available space between flanges 402. Pins 408 may include a thumb screw, where the thumb screw head extends beneath frame 102 to be manipulated easily. Plates 104, 106 may rest directly on the upper ends of the one or more pins 408. Alternatively, the one or more pins 408 may press upon a support member (not shown) against which plates 104, 106 may rest to ease insertion of plates 104, 106.

Figure 5:
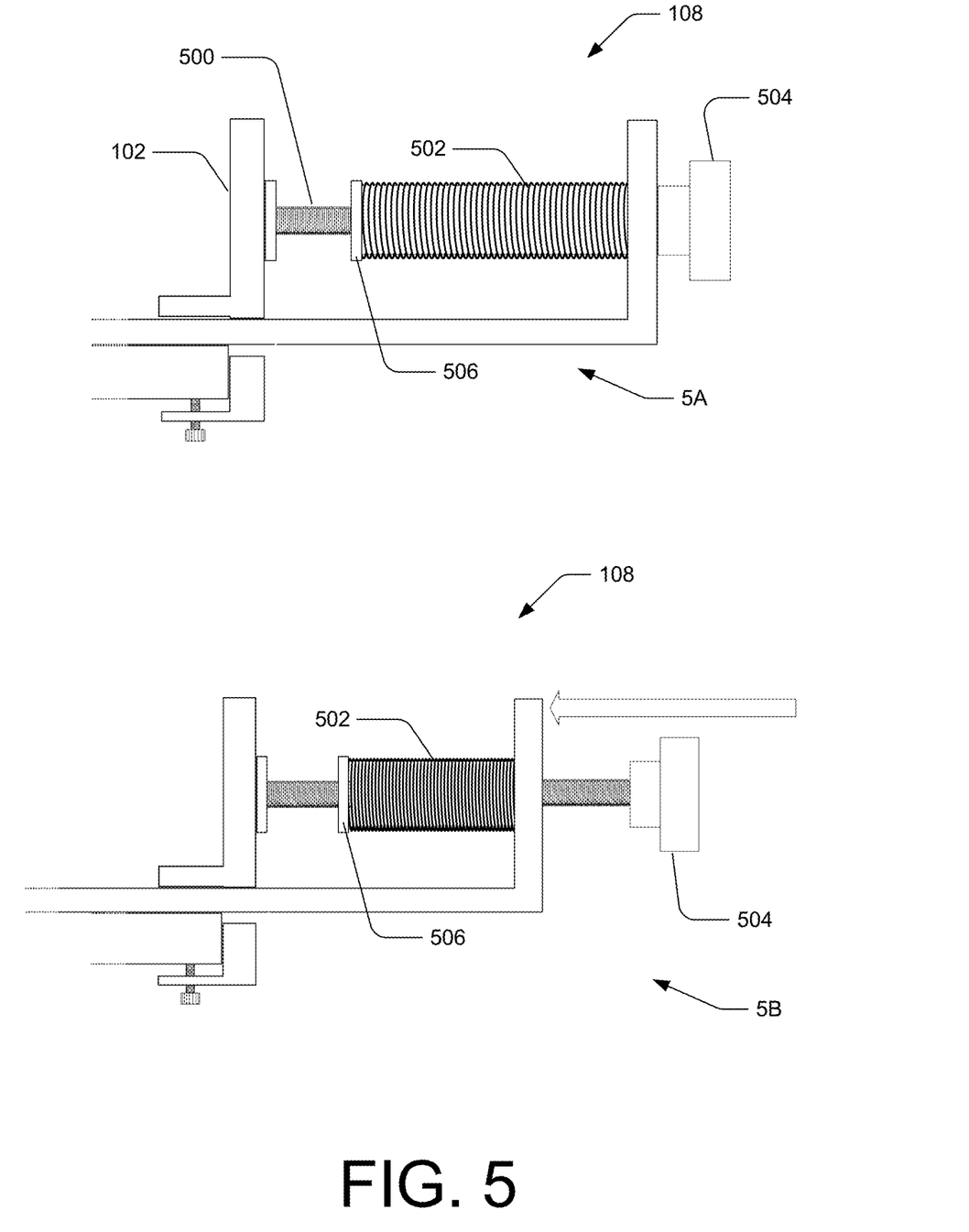
FIG. 5 illustrates a slide actuation mechanism for returning the top plate to a default position according to an embodiment of this disclosure.

FIG. 5 illustrates side views 5A and 5B of slide actuation system 108 in place in drop seeder device 100. Slide actuation system 108 may include a threaded bolt 500 fixed in place and extending outwardly from an end side wall of frame 102. Threaded bolt 500 extends to a length sufficient to pass through hole 208 in second end 204 of top plate 104 when top plate 104 is inserted into frame 102. Slide actuation system 108 may further include a spring 502 and a knob 504. In an embodiment, spring 502 may be a coil, compression spring to provide both tension and compression. Spring 502 may be loaded on to bolt 500 and disposed between frame 102 and a surface of second end 204 that faces the device. Knob 504 may be secured to a distal end of bolt 500 against a surface of second end 204 that faces away from the device. Side view 5A shows spring 502 uncompressed, and side view 5B shows spring 503 compressed, as indicated by the arrow.

Additionally, in an embodiment, slide actuation system 108 may include a spring adjustment member 506 disposed along bolt 500 between spring 502 and frame 102. Spring adjustment member 506 may be structured to be fixed in place along bolt 506 at various positions to restrict a space available in which spring 502 may expand. Thus, the amount of compression required of spring 502 to actuate and slide top plate 104 may be adjusted by rotating spring adjustment member 506 closer to or farther from spring 502, thereby compressing spring 502 into a tighter position and increasing tension or allowing spring 502 greater space to expand. In an embodiment, spring adjustment member 506 may be a nut or other threaded element to be moved along bolt 500 easily while remaining in place.

Figure 6:
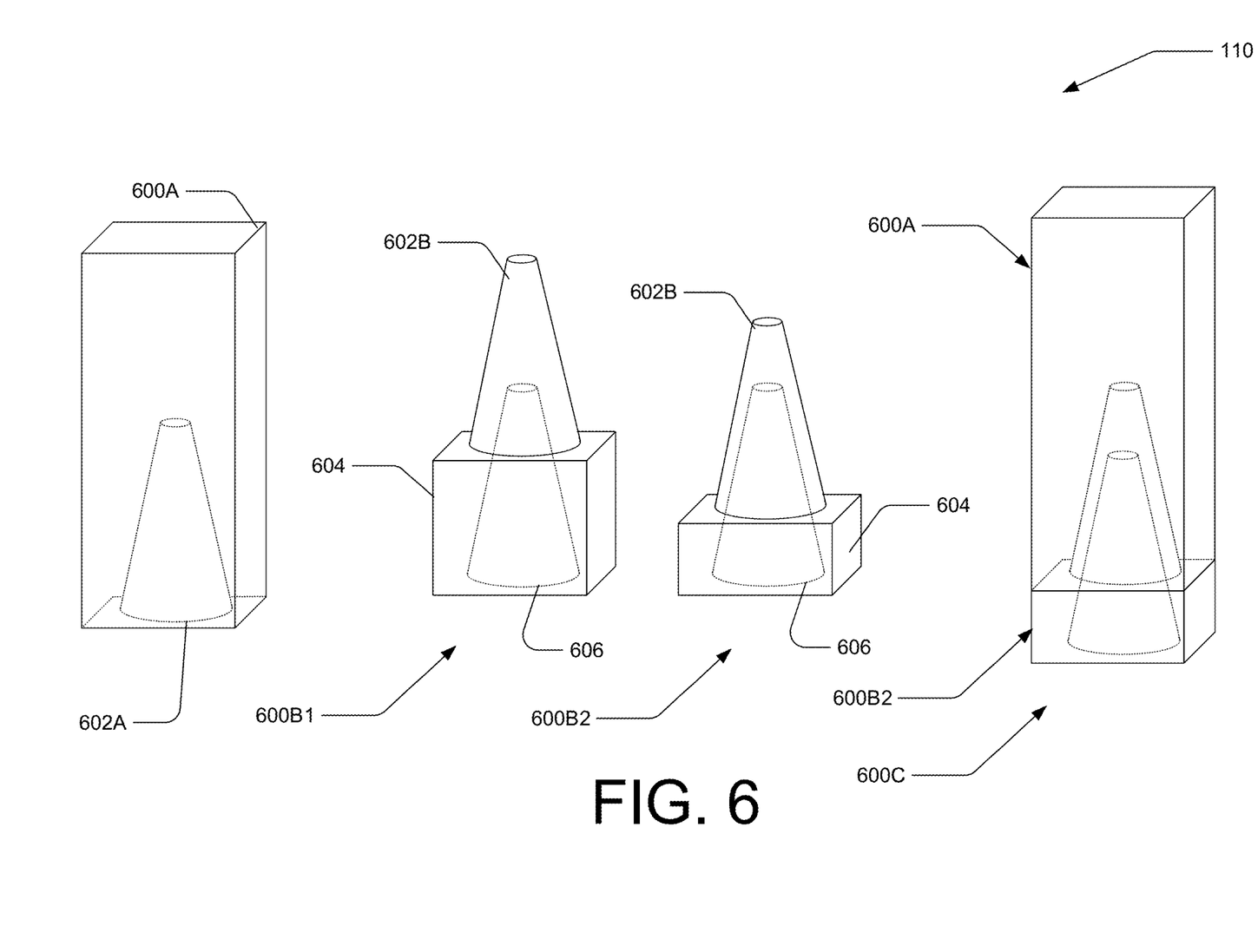
FIG. 6 illustrates a legs system for adjusting the height of the drop seeder according to an embodiment of this disclosure.

FIG. 6 depicts a system of quickly adjustable legs 110 including at least a first leg portion 600A and one or more second leg portions 600B1, 600B2 (hereinafter collectively referred to as 600B). First leg portion 600A is configured to attach to frame 102 at a position that does not interfere with a tray disposed beneath drop seeder device 100. As a standalone piece, first leg portion 600A may be implemented as a leg of a predetermined height for trays that fit beneath drop seeder device 100 without lifting first leg portion 600A from contact with a surface on which drop seeder device 100 is supported. In the event a tray is taller than a height of first leg portion 600A, a user may connect the one or more second leg portions 600B, which may add varying heights, to the first leg portion 600A.

As indicated above, first leg portion 600A may attach to second leg portion 600B at an end of first leg portion 600A that is distal from frame 102. First leg portion 600A has a cavity 602A opening at a bottom surface thereof. A shape of cavity 602A corresponds to a shape of an external surface of a connector section 602B that extends from a block section 604 of second leg portion 600B. That is, each second leg portion 600B includes a connector section 602B integral with a block section 604 of varying heights. Connector section 602B is shaped to be inserted and securely seated in cavity 602A of first leg portion 600A. Furthermore, second leg portion 600B also may have a cavity 606 opening at a bottom surface thereof to accommodate insertion of an additional second leg portion 600B. Thus, a leg 110 of drop seeder device 100 may be modified in height by increasing height via adding, or decreasing height via removing, one or more second leg portions 600B to or from a first leg portion 600A on each of the legs 110 of the system of legs 110. In an embodiment, as shown in leg 600C, one second leg portion 600B2 is inserted into cavity 602A of first leg portion 600A, thereby increasing an overall length of leg 110 by the length of block section 604.

Figure 7:
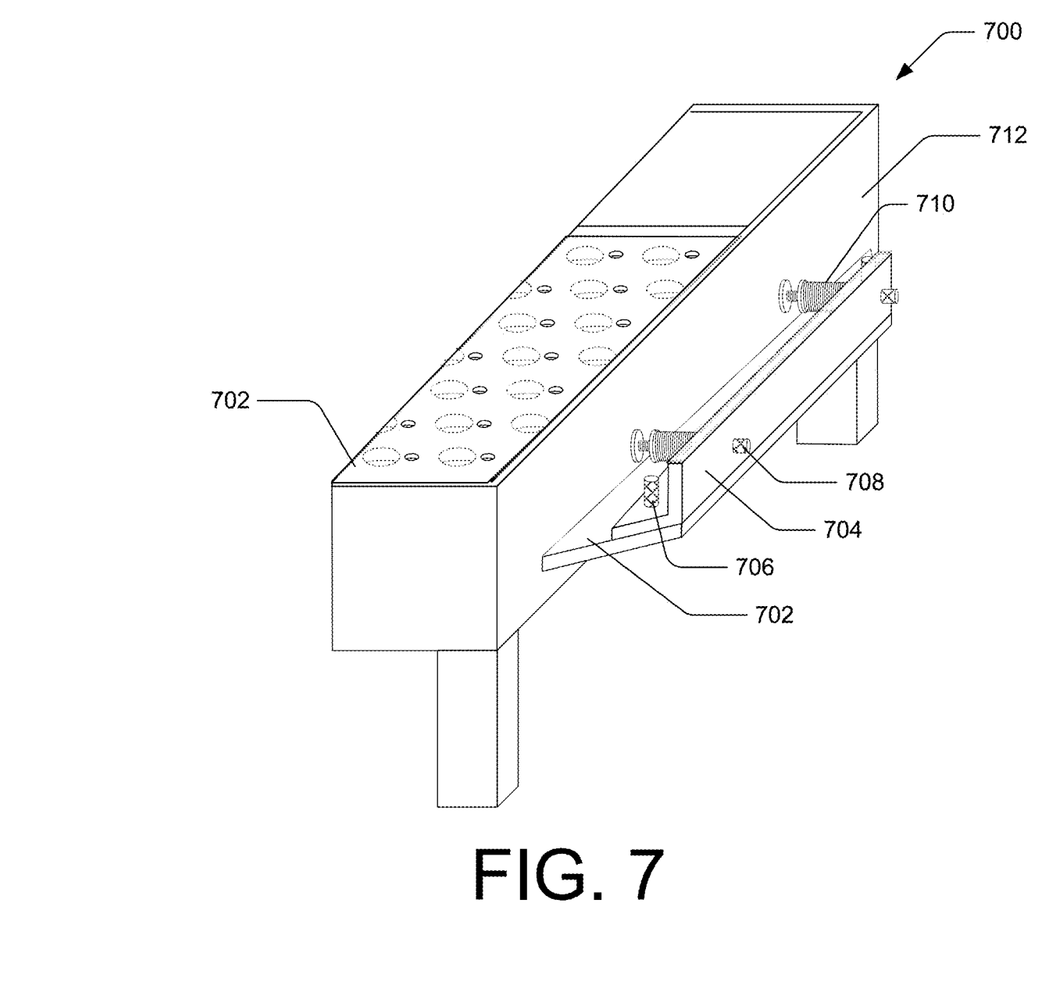
FIG. 7 illustrates a section view of another slide actuation mechanism for returning the top plate to a default position according to an embodiment of this disclosure.

FIG. 7 depicts an exemplary perspective view of an end section of a drop seeder device 700 according to an alternative embodiment, which utilizes a multi-spring actuation mechanism. In use, seeds are placed into drop seeder device 700 when positioned above a tray T having multiple pots into which seeds are directed via passing through drop seeder device 700. Various components of drop seeder device 700 are adjustable and/or interchangeable, thereby improving the utility of the device. As an example, sliding top plate 702 may be interchanged for a thicker or thinner top plate dependent on a user-desired preference.

In an embodiment, the drop seeder device 700 utilizing the multi-spring actuation mechanism may include the sliding top plate 702, a connecting member bracket 704 that is coupled to the sliding top plate 702 by one or more thumbscrews 706. Additionally, the connecting member bracket 704 may be permanently or removably coupled to the frame 712 of the drop seeder device 700 by one or more connecting members 708 and/or one or more actuation springs 710. Although the example drop seeder device 700 illustrated in FIG. 7 utilizes two actuation springs 708 and two connecting members 710 to couple the connecting member bracket 704 to the frame 712, additional actuation springs 708 or connecting members 710 may be used to increase tension and/or uniformity of seeder device 700.

CONCLUSION

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

What is claimed is:

1. A drop seeder apparatus comprising:
a frame;
a bottom plate having a plurality of through holes, the bottom plate secured in the frame;
a top plate having a plurality of through holes, the top plate secured in the frame and positioned in a sliding relationship with respect to the bottom plate;
a system of legs attached to a side of the frame adjacent to the bottom plate, the system of legs including leg portions that extend from the frame such that when the drop seeder apparatus is set on a surface, the bottom plate is suspended a predetermined distance away from the surface, the predetermined distance being determined based at least in part on a height of a seed tray; and
one or more pins, movable in a vertical direction, extending from a bottom of the frame into a gap between parallel flanges in which the top plate and the bottom plate are supported, whereby a size of the gap is variable.

2. The drop seeder apparatus according to claim 1, wherein a length of the leg portions is adjustable to allow variance in the predetermined distance at which the bottom plate is suspended away from the surface.

3. The drop seeder apparatus according to claim 1, wherein the leg portions of the system of legs are first leg portions and have a cavity opening at a bottom end thereof, and
wherein the system of legs further includes second leg portions having a connector section on a block section, the connector section shaped to be securely inserted in the cavity of a first leg portion.

4. The drop seeder apparatus according to claim 1, further comprising a slide actuation system including:
a bolt extending from a surface of the frame outwardly through an edge of the top plate,
a spring loaded on the bolt between the frame and the edge of the top plate, and
a knob disposed on a distal end of the bolt opposite the edge of the top plate.

5. The drop seeder apparatus according to claim 4, wherein the slide actuation system further includes a threaded nut disposed between the spring and the frame on the bolt.

6. The drop seeder apparatus according to claim 1, wherein the top plate has an end that extends in a direction transverse to a direction of extension of a planar body of the top plate.

7. A drop seeder apparatus comprising:
a frame;
a bottom plate having a plurality of through holes, the bottom plate secured in the frame;
a top plate having a plurality of through holes, the top plate secured in the frame and positioned in a sliding relationship with respect to the bottom plate; and
a slide actuation system including:
a bolt extending from a surface of the frame outwardly through an edge of the top plate,
a spring loaded on the bolt between the frame and the edge of the top plate, and
a knob disposed on a distal end of the bolt opposite the edge of the top plate.

8. The drop seeder apparatus according to claim 7, wherein the slide actuation system further includes a threaded nut disposed between the spring and the frame on the bolt.

9. The drop seeder apparatus according to claim 7, wherein the top plate has an end that extends in a direction transverse to a direction of extension of a planar body of the top plate.

10. The drop seeder apparatus according to claim 7, further comprising one or more thumb screws extending from a bottom of the frame into a gap between parallel flanges into which the top plate and the bottom plate are supported.

11. The drop seeder apparatus according to claim 7, a system of legs attached to a side of the frame adjacent to the bottom plate, the system of legs including leg portions that extend from the frame such that when the drop seeder apparatus is set on a surface, the bottom plate is suspended a predetermined distance away from the surface, the predetermined distance being determined based at least in part on a height of a seed tray.

12. The drop seeder apparatus according to claim 11, wherein a length of the leg portions is adjustable to allow variance in the predetermined distance at which the bottom plate is suspended away from the surface.

13. The drop seeder apparatus according to claim 11, wherein the leg portions of the system of legs are first leg portions and have a cavity opening at a bottom end thereof, and
wherein the system of legs further includes second leg portions having a connector section on a block section, the connector section shaped to be securely inserted in the cavity of a first leg portion.

14. A drop seeder apparatus comprising:
a frame;
a bottom plate having a plurality of through holes, the bottom plate secured in the frame;
a top plate having a plurality of through holes, the top plate secured in the frame and positioned in a sliding relationship with respect to the bottom plate;
a system of legs configured to adjust a length thereof to accommodate seed trays of varying heights; and
a slide actuation system configured to allow a user to slide the top plate across the bottom plate and cause the top plate to automatically return to a default trap position, wherein the slide actuation system includes:
a bolt extending from a surface of the frame outwardly through an edge of the top plate, and
a spring loaded on the bolt between the frame and the edge of the top plate.

15. The drop seeder apparatus according to claim 14, wherein the system of legs is attached to a side of the frame adjacent to the bottom plate, the system of legs including leg portions that extend from the frame such that when the drop seeder apparatus is set on a surface, the bottom plate is suspended a predetermined distance away from the surface, the predetermined distance being determined based at least in part on a height of a seed tray.

16. The drop seeder apparatus according to claim 15, wherein a length of the leg portions is adjustable to allow variance in the predetermined distance at which the bottom plate is suspended away from the surface.

17. The drop seeder apparatus according to claim 15, wherein the leg portions of the system of legs are first leg portions and have a cavity opening at a bottom end thereof, and
wherein the system of legs further includes second leg portions having a connector section on a block section, the connector section shaped to be securely inserted in the cavity of a first leg portion.

18. The drop seeder apparatus according to claim 14, further comprising one or more thumb screws extending from a bottom of the frame into a gap between parallel flanges in which the top plate and the bottom plate are supported.

* * * * *